United States Patent

[11] 3,604,187

| [72] | Inventor | Edwin J. Weber<br>Baltimore, Md. |
|---|---|---|
| [21] | Appl. No. | 862,685 |
| [22] | Filed | Oct. 1, 1969 |
| [45] | Patented | Sept. 14, 1971 |
| [73] | Assignee | The Black and Decker Manufacturing Company<br>Towson, Md. |

[54] LAWN MOWER HANDLE CONSTRUCTION
4 Claims, 7 Drawing Figs.

[52] U.S. Cl. ................................................ 56/249,
56/DIG. 18, 280/47.37, 306/12
[51] Int. Cl. ........................................................ A01d 55/20
[50] Field of Search ..........................................
56/249-256, 25.4, 26.5, DIG. 18; 306/11, 12, 13
287/14; 280/47.37

[56] References Cited
UNITED STATES PATENTS

| 688,189 | 12/1901 | Mason | 306/11 UX |
| 743,838 | 11/1903 | Duffy | 306/11 UX |
| 843,770 | 2/1907 | Ru-Ton | 306/11 |
| 1,799,919 | 4/1931 | Mason | 306/11 |
| 2,108,003 | 2/1938 | Stough | 306/11 X |
| 2,254,667 | 9/1941 | Taylor | 306/12 |
| 2,269,920 | 1/1942 | Seaver | 56/DIG. 18 |
| 2,727,753 | 12/1955 | Johnson et al. | 280/47.37 |
| 3,144,258 | 8/1964 | Ottosen et al. | 280/47.37 |

FOREIGN PATENTS

| 113,629 | 3/1941 | Australia | 306/12 |
| 113,857 | 4/1941 | Australia | 306/12 |

*Primary Examiner*—Louis G. Mancene
*Assistant Examiner*—J. A. Oliff
*Attorneys*—Leonard Bloom and Joseph R. Slotnik

ABSTRACT: A lawn mower including a housing supported for movement by ground engaging wheels. A motor driven wheel is rotatably supported upon the housing and cooperates with a bed knife to cut grass. A handle is inclined upwardly from the housing to facilitate manipulation and control of the mower. The handle is adapted to be moved into a generally vertical position relative to the housing and/or to be folded intermediate its length for mower storage.

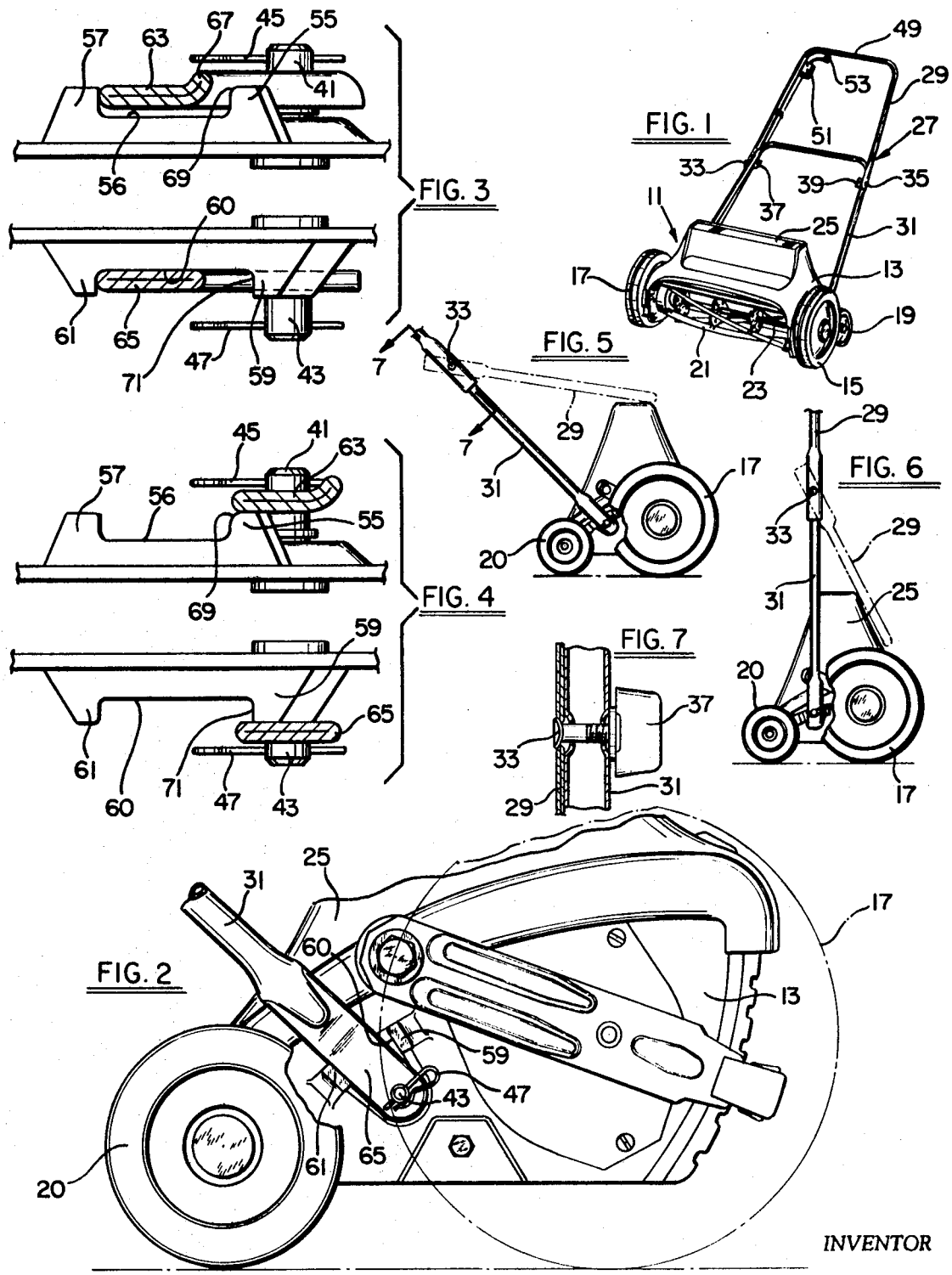

LAWN MOWER HANDLE CONSTRUCTION

SUMMARY OF THE INVENTION

The present invention is directed to a novel handle and handle mounting construction for a lawn mower and the like, which construction optimizes strength, rigidity and utility during mower use, but which facilitates quick and easy movement of the handle to an inactive or storage position. The handle includes a base portion pivoted to the housing. Means on the housing is cooperable with means on the handle to retain the handle in an inclined "operating" position or in a vertical "storage" position. However, the retaining means is releasable whereby the handle can be moved from the "operating" position to the "storage" position, or from the "storage" position to the "operating" position, the latter being somewhat easier than the former. In addition, the handle is foldable, substantially at a midpoint, to further accommodate mower storage.

Main objects of the present invention are to provide a novel handle mounting construction for a lawn mower and the like, which construction securely retains the handle in a normal "operating" position but which allows the handle to be quickly and easily moved to and retained in an inactive or "storage" position, and vice versa, the latter being somewhat easier than the former.

Further important objects of the invention are to provide a novel handle mounting construction of the above character which employs a minimum of separate parts, allowing most of the parts to be integrally formed with the handle and mower housing, and wherein the handle may be folded substantially midway of its length to further accommodate mower storage.

Additional important objects are to provide a novel construction of the above character which is relatively inexpensive to manufacture, rugged in construction, and reliable in use.

Other objects and advantages of the present invention will become more apparent from a consideration of the detailed description to follow taken in conjunction with the drawings annexed hereto.

BRIEF DESCRIPTION OF THE DRAWINGS

FIG. 1 is a perspective view illustrating a lawn mower embodying the present invention;

FIG. 2 is an enlarged view of a portion of the mower of FIG. 1, with parts broken away and removed for clarity, and illustrating the present invention;

FIG. 3 is an enlarged view illustrating the "operating" position of both sides of the handle;

FIG. 4 is a view similar to FIG. 3 but showing the parts in the "storage" position;

FIG. 5 is a side elevational view illustrating the handle in the "operating" position and, in dot-dash lines, the handle folded at a midpoint; and FIG. 6 is a view similar to FIG. 5 but showing the handle in the "storage" position.

Broadly described, the present invention relates to a handle mounting construction for a lawn mower comprising a housing, a generally U-shaped handle pivoted at its ends to opposite sides of said housing, laterally projecting, spaced sets of lugs on each of said opposite housing sides defining at least one recess at each housing side for receiving said handle adjacent its ends and retaining said handle in one pivoted position on said housing, one set of said lugs and the associated end of said handle having cooperable surfaces for effecting a camming of said associated handle end clear of said one lug when said handle is pivoted at least in one direction on said housing, the other end of said handle and the associated set of lugs being cooperable to prevent camming of said other handle end out of the recess defined by said associated set of lugs, said handle being pivotally adjusted relative to said housing in said at least one direction by manually withdrawing said other handle end laterally out of its associated recess and thereafter manually pivoting said handle.

DETAILED DESCRIPTION

Referring now more specifically to the drawings, a lawn mower embodying the present invention is illustrated generally at 11 in FIG. 1 and is seen to include a housing 13 supported for movement along the ground by a pair of relatively large front wheels 15,17 and a pair of relatively small rear wheels 19, 20. A bladed cutting reel 21 is rotatably supported upon the housing 13 and cooperates with a stationary bed knife 23 to cut grass. The reel is adapted to be rotated by an electric motor (not shown) supported atop the housing 13 and covered by a protective shroud 25.

An upstanding handle 27 is provided for control and manipulation of the mower 11. As shown, the handle 27 includes two generally U-shaped members 29, 31 interconnected by threaded fasteners 33,35 and hand knobs 37,39. Preferably, but not necessarily, the handle member 29 is channel shaped at its ends to fit over the handle member 31 and is held in place when the hand knobs 37,39 are tightened on the fasteners 33,35. The lower ends of the handle member 31 are secured to the housing 13 by pins 41,43 and cotter keys 45,47. The upper handle member 29 s provided with a hand grip 49 and has a switch 51 secured thereto. A pivotal lever 53 is provided to actuate the switch 51 and correspondingly turn the motor (not shown) on and off.

Shown in FIGS. 1 and 2, and in full lines in FIG. 5, is the handle 27 in a normal, "operating" position. In this position, the handle portions 29,31 are substantially in line and the handle 27 extends at an upwardly inclined angle from the housing 13. The handle 27 is retained in this position by means of pairs of lugs 55,57 and 59, 61 formed integral with the housing 13. As shown, the lugs 55,57 are formed adjacent the pivot pin 41 and define an outwardly facing recess 56 which receives a flattened end portion 63 of the handle 31. Similarly, the lugs 59, 61 are formed adjacent the pivot pin 43 and define a recess 60 which receives a flattened end portion 65 of the handle 31.

The parts thus far described are dimensioned such that the flattened end portions 63,65 of the handle portion 31 are normally retained in place within the recesses 56,60 between the lugs 55, 57 and 59, 61 respectively. In this position of the parts, shown in FIGS. 2 and 3, the handle portion 31 is retained in an upwardly inclined "operating" position from the housing 13. A limited amount of pivotal movement of the handle portion 31 is permitted in this position of the parts since the recesses 56, 60 are slightly larger than the width of the handle flattened portions 63, 65.

When it is desired to move the handle 27 to an upright "storage" position, the handle portion 31, and specifically the flattened portions 63, 65, are spread apart to clear the lugs 55, 59, respectively, so that the flattened portions 63, 65 can move out of the recesses 56, 60, respectively, as shown in FIG. 4. To this end, one of the flattened handle portions 63, 65 and the cooperating one of the lugs 55, 59 are provided with cooperating surfaces adapted to cam that flattened handle portion clear of its lug. Thus the flattened handle portion 63 has its leading edge 67 bent outwardly beyond the lug 55. In addition, that lug 55 is rounded, as shown at 69, at its edge adjacent the handle portion 63. Therefore, when the flattened handle portion 63 is moved against the lug 55, the leading edge 67 cams over the lug 55.

The other flattened handle portion 65 confronts a flat edge 71 on the lug 59 so that this handle portion 65 cannot normally move past the lug 59. Thus, even though the flattened portion 63 and lug 55 are formed with cooperable "cam" surfaces, the handle 27 is prevented from inadvertently being moved from the "operating" to the "storage" position.

When however, it is desired to so move the handle 27 from the "operating" to the "storage" position, the operator grasps the handle portion 31 near the flattened portion 65 and pulls it laterally to a position clear of the lug 59 (it being understood that the handle portion 31 possesses sufficient resiliency to allow this). Thereafter, and while so holding the handle portion 31, the handle 27 is pivoted about the pins 41, 43 toward an upright or vertical position with the leading edge 67 of the flattened portion 63 camming over the lug 55. The frictional force of the flattened portions 63, 65 bearing against the outer surfaces of the lugs 55, 59, respectively, is sufficient to hold the handle 27 in the "storage" position and when it is desired to reposition the handle 27 in the "operating" position, the operator simply pushes the handle 27 rearwardly whereby the flattened portions 63, 65 snap back between the lugs 55, 57 and 59, 62, and into the recesses 56, 60, respectively.

Should the handle 27 be pivoted past the upright "storage" position and the flattened portions 63, 65 moved completely past the lugs 55, 59, the handle 27 can be moved back to the "operating" position again simply by pivoting the handle 27 rearwardly about the pivot pins 41, 43. To this end, the lugs 55, 59 are sloped at their outer edges as shown at 73, 75 to cam the flattened handle portion 63, 65 apart as the handle 27 is pivoted rearwardly. Continued rearward pivotal movement of the handle 27 causes the flattened handle portions 63, 65 to snap into the recesses 56, 60.

To further enhance the storage capabilities of the mower 11, the handle portions 29, 31 may be folded as shown in dot-dash lines in FIGS. 5 and 6. To this end, the knobs 37, 39 are loosened on the fasteners 33, 35 whereupon the channel-shaped ends of the handle portion 29 can move outwardly clear of the handle portion 31 when the handle member 29 is pivoted about the fasteners 33, 35 relative to the handle portion 31. This storage position of the handle portion 29 may be used with the handle portion 31 in the "operating" position (shown in FIG. 5) or in the "storage" position (shown in FIG. 6).

When it is desired to reposition the handle portions 29, 31 in line, the portion 29 is pivoted back to the position shown in FIGS. 1 and 2 and in full lines in FIGS. 5 and 6 and the knobs 37, 39 are tightened on the fasteners 33, 35.

While a preferred embodiment of the present invention has been illustrated and described above in detail, various additions, substitutions, modifications, and omissions may be made thereto without departing from the spirit of the invention.

I claim:

1. A handle mounting construction for a lawn mower comprising a housing, a generally U-shaped handle pivoted at its ends to opposite sides of said housing, laterally projecting, spaced sets of lugs on each of said opposite housing sides defining at least one recess at each housing side for receiving said handle adjacent its ends and retaining said handle in one pivoted position on said housing, one set of said lugs and the associated end of said handle having cooperable surfaces for effecting a camming of said associated handle end clear of said one lug when said handle is pivoted at least in one direction on said housing, the other end of said handle and the associated set of lugs being cooperable to prevent camming of said other handle end out of the recess defined by said associated set of lugs, said handle being pivotally adjusted relative to said housing in said at least one direction by manually withdrawing said other handle end laterally out of its associated recess and thereafter manually pivoting said handle.

2. A construction as defined in claim 1 wherein said recesses retain said handle in an upwardly inclined position, said handle being movable to a generally vertical position when pivoted in said at least one direction, said handle legs bearing frictionally against associated ones of said lugs when said handle is in said generally vertical position.

3. A construction as defined in claim 1 wherein said associated handle end is tapered outwardly defining said camming surface and is positioned to cam over one lug of said one set of lugs when said handle is pivoted in said at least one direction.

4. A construction as defined in claim 1 wherein each of said lugs has a cam surface engageable with said handle ends to cam said handle ends over said lugs when said handle is pivoted from a position where said handle ends are outside said recesses to a position where said handle ends are within said recesses.